(12) United States Patent
Katoch et al.

(10) Patent No.: US 8,581,658 B2
(45) Date of Patent: Nov. 12, 2013

(54) CHARGE PUMP

(75) Inventors: Atul Katoch, Kanata (CA); Cormac Michael O'Connell, Ontario (CA)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 205 days.

(21) Appl. No.: 13/082,918

(22) Filed: Apr. 8, 2011

(65) Prior Publication Data

US 2012/0256681 A1 Oct. 11, 2012

(51) Int. Cl.
*G05F 1/10* (2006.01)
*G05F 3/02* (2006.01)

(52) U.S. Cl.
USPC ......................................... 327/536

(58) Field of Classification Search
USPC ........................ 327/536; 363/59–60
See application file for complete search history.

(56) References Cited

U.S. PATENT DOCUMENTS

| | | | | |
|---|---|---|---|---|
| 6,320,796 B1* | 11/2001 | Voo et al. | ................ | 365/189.09 |
| 6,424,570 B1* | 7/2002 | Le et al. | ................... | 365/185.18 |
| 7,602,231 B2* | 10/2009 | Yamamoto et al. | ........... | 327/536 |
| 2007/0262416 A1* | 11/2007 | Eshun et al. | .................. | 257/532 |

* cited by examiner

*Primary Examiner* — Quan Tra
(74) *Attorney, Agent, or Firm* — Lowe Hauptman & Ham, LLP

(57) ABSTRACT

A charge pump circuit comprises a first node, a second node, and at least one capacitance stage coupled between the first node and the second node. Capacitance stages of the at least one capacitance stage are coupled in series. A capacitance stage of the at least one capacitance stage includes a capacitive device and a voltage limiter coupled in parallel with the capacitor. The voltage limiter is configured to limit a voltage dropped across the capacitor. The capacitive device and the voltage limiter are configured such that a first current flowing through a first branch having the voltage limiter is more than a second current flowing through a second branch having the capacitive device.

18 Claims, 2 Drawing Sheets

CHARGE PUMP

FIELD

The present disclosure is related to a charge pump.

BACKGROUND

Many approaches use gate capacitance of a transistor to pump charge in a charge pump. The transistor could be N-type or P-type Metal-Oxide Silicon, i.e., NMOS or PMOS, respectively. The gate capacitance of a single-gate transistor, however, is relatively small. To improve pump capacities, a large number of gates and thus a large die area is required. Further, using the gate capacitance is inefficient because, when the transistor is off, there is no gate capacitance and thus no capacitance for the charge pump. For example, when a voltage applied at the gate of the transistor is less than the threshold voltage of the transistor, the transistor is off, resulting in no capacitance. In other words, the gate capacitance exists and the pump function operates only when the gate voltage is above the threshold voltage. Additionally, the threshold voltage is larger at low temperatures and thus further reduces efficiency and pump ability.

BRIEF DESCRIPTION OF THE DRAWINGS

The details of one or more embodiments of the disclosure are set forth in the accompanying drawings and the description below. Other features and advantages will be apparent from the description, drawings, and claims.

Like reference symbols in the various drawings indicate like elements.

DETAILED DESCRIPTION

Figure 1:
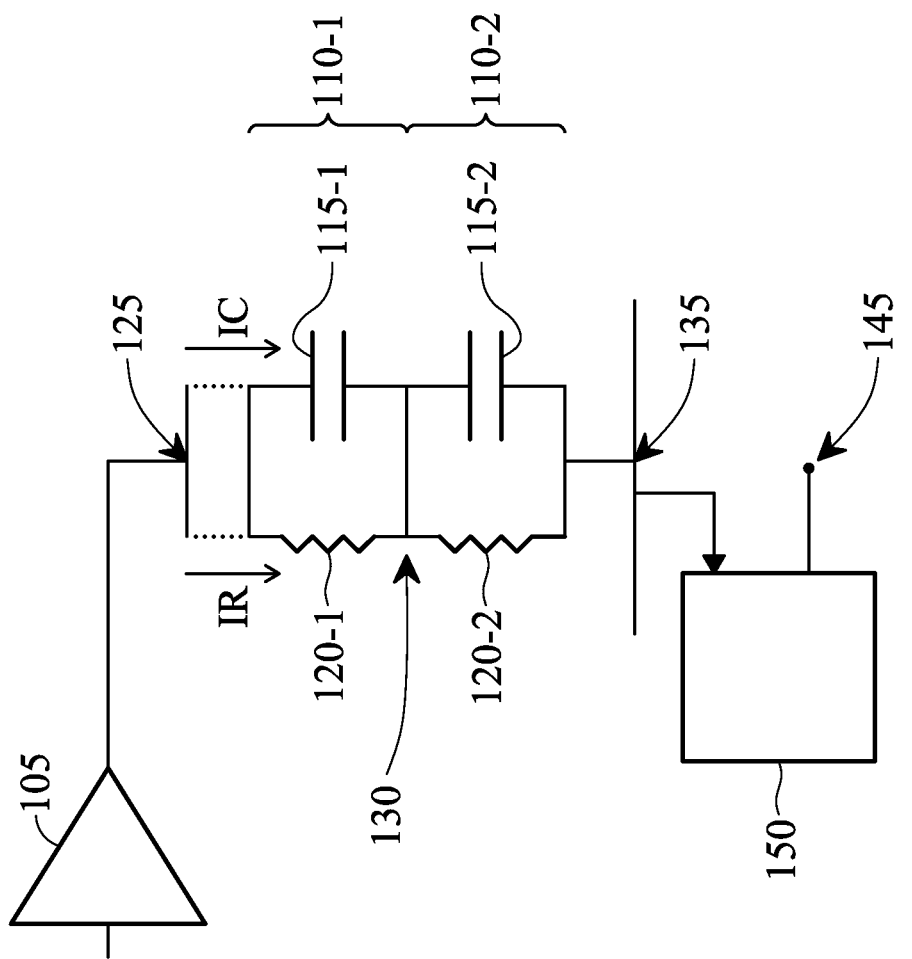
FIG. 1 is a diagram of a pump circuit, in accordance with some embodiments.

Embodiments, or examples, illustrated in the drawings are disclosed below using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art. Reference numbers may be repeated throughout the embodiments, but they do not require that feature(s) of one embodiment apply to another embodiment, even if they share the same reference number.

Some embodiments have one or a combination of the following features and/or advantages. The metal-insulator-metal (MIM) capacitors are used to boost charge in a charge pump. The pump efficiency is high, and is independent from the threshold voltage that is higher at low temperatures and that causes additional inefficiency in other approaches. The capacitance per unit area of the MIM capacitors is high. As a result, the die area for the MIM capacitors and related circuitry in various embodiments is small. Protection circuits are also used to prevent the voltage applied across the MIM capacitors that is greater than the MIM capacitors can withstand. The MIM capacitors are therefore protected from damage.

Exemplary Circuit

FIG. 1 is a diagram of a charge pump circuit 100, in accordance with some embodiments. For illustration, the voltages at nodes 125, 130, 135, and 145 are voltages V125, V130, V135, and V145, respectively. Each of the voltages, for simplicity is not labeled.

Node 145 is the output of charge pump circuit 100. Node 125 carries the initial voltage from which the charge is pumped to cause a voltage change at node 145 by a pump voltage Vpump (not labeled). Pump voltage Vpump is the voltage difference between voltage V145 and voltage V125, and is positive or negative. For example, if voltage V145 increases from voltage V125, then pump voltage Vpump is positive. But if voltage V145 decreases from voltage V125, then pump voltage Vpump is negative. For illustration, voltage V125i at 0 V is the initial direct current (DC) voltage level at node 125, and pump voltage Vpump is 1 V. Initially, if voltage V145 is at 2 V, then, with a pump voltage Vpump of 1 V, voltage V145 is at 3 V after pumping. In other words, node 145 is pumped by 1 V, from 2 V to 3 V. Circuitry between node 125 and 145 is commonly called a pump stage. Depending on applications, more than one pump stage may be used in circuit 100.

In some embodiments, node 145 is pumped by the voltage switching at nodes 125 and 135. In the example that initial voltage V125i is 0 V and pump voltage Vpump is 1 V, then node 125 switches between 0 V and 1 V. For illustration, switching period or the pump cycle is time period T. At time t1, for example, node 125 switches from 0 V to 1 V, and stays at 1 V for the time period T/2. At time t2, for example, node 125 switches from 1 V to 0 V, and stays at 0 V for the next time period T/2, until time t3, for example.

Further, for the example that node 145 is pumped from 2 V to 3 V, while node 125 switches between 0 V and 1 V, node 135 is initially at 2 V, and switches between 2 V and 3 V. That is, at time t1, node 135 switches from 2 V to 3 V, and stays at 3 V for the time period T/2. At time t2, node 135 switches from 3 V to 2 V, and stays at 2 V for the next time period T/2 until time t3.

Circuit 150 transfers the charge/voltage at node 135 to node 145. Circuit 150 also enables node 145 to remain at the pumped voltage. In some embodiments, at time t1, when node 135 switches from 2 V to 3 V, circuit 150 is turned on so that the current/voltage and charge at node 135 are transferred from node 135 to node 145. Once the charge transfer from node 135 to node 145 is complete, circuit 150 is turned off to prevent the charge flowing from node 145 back to node 135. In some embodiments, the load at node 145 causes voltage V145 at node 145 to decrease. Circuit 100, however, by repeating the pump cycle, replenishes the charge for node 145, and causes node 145 to remain at 3 V. In some embodiments, a capacitor (not shown) is coupled to node 145 to reduce voltage ripples, if voltage ripples exist at node 145.

For illustration, the voltage difference between voltage V135 and voltage V125 is voltage V32 (not labeled) which, in various embodiments, is positive or negative, depending on whether pump voltage Vpump is positive or negative, respectively. For example, if voltage Vpump is positive, then voltage V135 is higher than voltage V125, and voltage V32 is positive. But if voltage Vpump is negative, then voltage V135 is lower than voltage V125, and voltage V32 is negative.

Driver 105 provides a mechanism for node 125 to switch between the initial voltage V125i and the pump voltage Vpump. That is, for node 125 to switch between 0 V and 1 V in the above example.

A capacitance stage 110 includes a capacitor 115 coupled in parallel with a resistor 120. For illustration, FIG. 1 shows stage 110-1 having capacitor 115-1 and resistor 120-1 coupled in parallel, and stage 110-2 having capacitor 115-2 and resistor 120-2 coupled in parallel. Stage 110-1 is coupled in series with stage 110-2. Stage 110-1 pumps voltage V125 to voltage V130 while stage 110-2 pumps voltage V130 to voltage V135. In some embodiments, the resistance value of each resistor 120 is the same, and the capacitance value of each capacitor 115 is the same. As a result, the pump voltage in every capacitance stage 110 is the same. That is, the voltage difference V130-V125 between voltage V130 and voltage V125 is the same as the voltage difference V135-V130 between voltage V135 and voltage V130. Without the effect of the capacitance at node 135 (explained below) the total voltages pumped in every stage 110 is equal to voltage Vpump. For example, if voltage Vpump is 1 V, node 130 is pumped by 0.5 V from voltage V125 at node 125, and node 135 is pumped by 0.5 V from voltage V130 at node 130. The number of capacitance stages 110 varies in various embodiments, depending on the voltage value of pump voltage Vpump, the maximum voltage allowed to drop across each capacitor 115, the capacitance value of each capacitor 115.

In some embodiments, capacitors 115 are metal-insulator-metal (MIM) capacitors that are used as memory cells to store charge/data in an embedded dynamic random access memory (eDRAM). The process of manufacturing the MIM capacitors as the eDRAM memory cells is used to manufacture capacitors 115 for use in circuit 100. In terms of capacitance per area unit, such process provides capacitance values much higher than capacitances made by other techniques. As a result, circuit 100 includes numerous capacitors 115 occupying a smaller die area than capacitors made by other techniques. There are various manufacturing processes and methods of making MIM capacitors for eDRAM, which are known to applicants and are not described in this document.

Each of resistors 120 is coupled in parallel with each of corresponding capacitors 115. Resistors 120 function as voltage limiters, and are used for illustration purposes. Other voltage limiters are within the scope of various embodiments. For example, resistors 120 are set such that the voltage dropped across a capacitor 115 does not exceed the maximum voltage allowed to drop across the corresponding capacitor 115. For another example, the maximum voltage dropped across a capacitor 115 is 0.5 V, the resistance values of resistors 120 are selected such that each of voltage V130-V125 and voltage V135-V130 does not exceed 0.5 V. In the embodiments of FIG. 1, resistors 120 function as a voltage divider to divide voltage V32. Effectively, resistors 120, while functioning as a voltage divider, also function as a voltage limiter that limits the voltage drop across capacitors 115. The voltage divider formed by resistors 120 provides a specific voltage dropped across each resistor 120 or each capacitor 115. As a result, the voltage dropped across a resistor 120 or across a capacitor 115 is limited by the fixed value generated by the voltage divider. For example, if voltage V32 is 1 V, resistors 120-1 and 120-2 divide 1 V of voltage V32 into increments of 0.5 V. Each of the voltages V130-V125 and V135-V130 is 0.5 V.

Resistors 120 also act as a current leakage path for capacitors 115. A large current IR flowing through resistors 120 reduces the amount of current IC flowing through capacitors 115. Resistors 120 serve as a current path, enable the current IR to flow through resistors 120, and also enable the voltage dropped across each capacitance stage 110 to be the same. Without resistors 120, for example, a current leakage in a first capacitor 115 is higher than a current leakage in a second capacitor 115, resulting in a voltage dropped across the first capacitor 115 being higher than the voltage dropped across the second capacitor 115. Consequently, the first capacitor 115 receiving the higher voltage is damaged. In other words, in various embodiments, there are not situations where a first voltage dropped across a first capacitor 115 is different from a second voltage dropped across a second capacitor 115 and a capacitor 115 is damaged because of the higher voltage. Current IC is the current leakage through the dielectric layers of capacitors 115. MIM capacitors 115, due to the large capacitance per unit area, are more susceptible to damage by high voltages than other types of capacitors. In some embodiments, resistors 120 are selected based on the maximum amount of current IC flowing through capacitors 115 without damaging capacitors 115. For example, resistors 120 are selected such that current IR is much more than current IC. In some embodiments, current IR is about 5 to 10 times current IC. For illustration, current IR is 10 times current IC, and R is the total resistance of resistors 120. As a result, $$R = V32/IR$$

or $$R = V32/(10*IC) \quad (1)$$

In some embodiments, current IC or the leakage current through a capacitor 115 is known based on the type of capacitor 115, such as a MIM capacitor. As a result, based on the above equation (1) in which voltage V32 and current IC are known, the resistance value of resistor R is calculated. The resistance of each resistor 120 is then determined accordingly. In the example of FIG. 1, R is the total resistance of resistors 120-1 and 120-2. The resistance of each resistor 120-1 and 120-2 is therefore half of the resistance of resistor R. In various embodiments, current IR is configured to be larger than current IC when circuit 100 is in a standby mode, i.e., when circuit 100 is not actively pumping. For example, when the voltage at node 125 and/or 135 stays at a DC level Resistors 120 are used as examples, various circuits that limit the voltage dropped across capacitors 115 and that serve as the current leakage path for capacitors 115 are within the scope of various embodiments.

In some embodiments, the parasitic capacitance C135 (not labeled) at node 135 affects the voltage level at node 135 when node 125 switches between voltage V125i and voltage Vpump. For example, when voltage V125 changes 1 V, from 0 V to 1 V, voltage V135 may not change a full 1 V from 2 V to 3 V, due to the parasitic capacitance C135. If voltage $\Delta V135$ is the voltage change at node 135 based on voltage Vpump, CMIM is the total capacitance of capacitors 115 between node 125 and node 135 and Vtf is the voltage transfer ratio, then $$Vtf\ CMIM/(CMIM+C135)$$

and $$\Delta V135 = Vpump*Vtf$$

$$\Delta V135 = Vpump*(CMIM/(CMIM+C135))$$

In some embodiments, the capacitance of capacitor C135 at node 135 is known, e.g., by a measurement instrument. Capacitor CMIM and thus the number of capacitors 110, and the capacitance value of each capacitor 110 are selected such that the transfer ratio Vtf is at a predetermined value. For example, the transfer ratio Vtf is at least 95%. That is, Vtf>95% or the loss in the pump voltage Vpump is less than 5%. Capacitor CMIM is selected such that the capacitance of capacitor CMIM is more than 20 times greater than the capacitance of capacitor C135. In other words:

$$\Delta V135 > Vpump*(CMIM)/(CMIM+C135)$$

or $$\Delta V135 > V\text{pump}*(20*C135)/((20*C135)+C135)$$

or $$\Delta V135 > V\text{pump}*20/21$$

Exemplary Method

Figure 2:
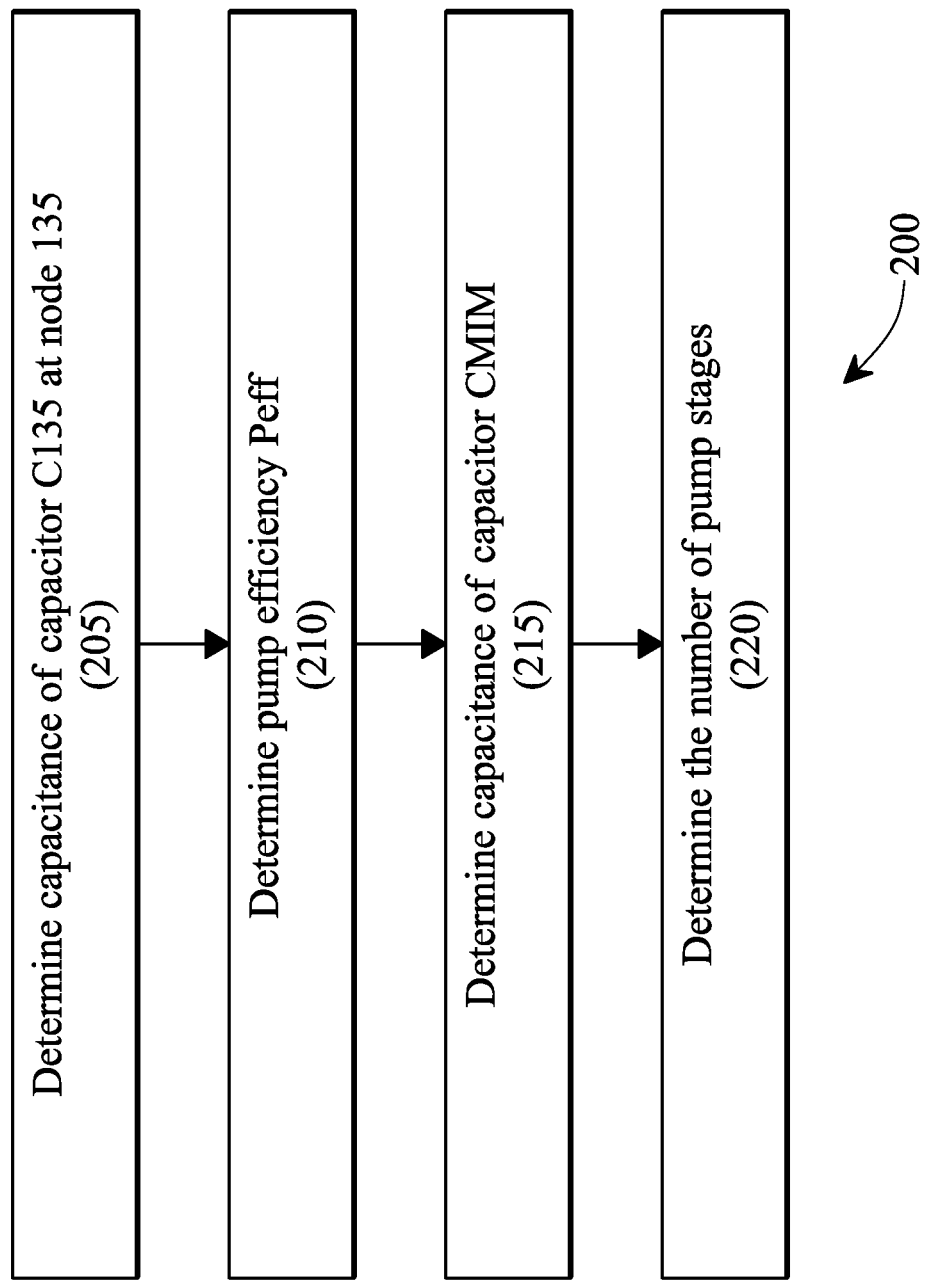
FIG. 2 is a flow chart illustrating a method of selecting capacitors and resistors, in accordance with some embodiments.

FIG. 2 is a flow chart illustrating a method of selecting capacitors 115 and resistors 120, in accordance with some embodiments.

In step 205, the capacitance of capacitor C135 at node 135 is determined, which, in some embodiments, is by measurement and/or by simulation.

In step 210, transfer ratio Vtf is determined. Determining transfer ratio Vtf is a balance between various factors, including, for example, the voltage transfer efficiency, the die area used by capacitors 115 in each capacitance stage 110, the number of pump stages in circuit 100. For example, the higher the transfer ratio Vtf is, the higher voltage at node 135 or node 145 is pumped, but the larger the capacitance value for the capacitor CMIM is, and thus a larger the number of capacitors 115 is used. As a result, a larger die area for a capacitance stage 110 and thus for a pump stage is occupied. On the other hand, the lower the transfer ratio Vtf, the fewer the number of capacitors 115 is used. As a result, a less die area for a capacitance stage 110 and thus for a pump stage is used. Nevertheless, the pumped voltage for a pump stage at node 135 or at node 145 is smaller. A smaller pumped voltage for a pump stage, however, in many situations, may result in an additional pump stage to achieve a desired pumped voltage for the whole system, which results in a larger die area as a whole. In some embodiments, transfer ratio Vtf is determined to achieve an optimum die area for a particular pump circuit 100.

In step 215, capacitor CMIM is determined based on the equation Vtf=CMIM/(CMIM+C135).

In step 220, the number of capacitors 115 and thus the number of capacitance stages 110 is selected based on the capacitance of capacitor CMIM, the capacitance of each capacitor 115, the pump voltage Vpump, and the maximum voltage allowed to drop across a capacitor 115. For example, in the example of FIG. 1, the pump voltage Vpump is 1 V. The maximum voltage allowed to drop across a capacitor 115 is 0.5V. As a result, there are two capacitors 115 in series, and thus two capacitance stages 110-1 and 110-2. But if voltage Vpump is 1.5 V, there would be three capacitors 115 in series, etc. The capacitance of each capacitor 115 is chosen accordingly.

Various embodiments are advantageous over other approaches. MIM capacitors used as capacitors 115 have a higher capacitance per unit area than other type of capacitors. MIM capacitors 115 do not depend on the operational state of the transistors that are used to provide the gate capacitance. As a result, there is no pump efficiency loss when the transistors are off in other approaches. The voltage dropped across a capacitor 115 that can damage capacitor 115 is limited by the corresponding resistor 120 or the voltage limiter coupled in parallel with capacitor 115. The efficiency loss due to the parasitic capacitance C135 at node 135 is part of the process to select capacitors 115.

A number of embodiments have been described. It will nevertheless be understood that various modifications may be made without departing from the spirit and scope of the disclosure. For example, FIG. 1 shows the resistor/capacitor circuits (e.g., resistors 120, capacitors 115) using discrete resistors and capacitors for illustration only, equivalent circuitry may be used. For example, a resistive device, circuitry or network (e.g., a combination of resistors, resistive devices, circuitry, etc.) can be used in place of the resistor. Similarly, a capacitive device, circuitry or network (e.g., a combination of capacitors, capacitive devices, circuitry, etc.) can be used in place of the capacitor.

Some embodiments regard charge pump circuit comprising a first node, a second node, and at least one capacitance stage coupled between the first node and the second node. The at least one capacitance stage is coupled in series, if the at least one capacitance stage includes more than one capacitance stage. A capacitance stage of the at least one capacitance stage includes a capacitive device and a voltage limiter coupled in parallel with the capacitor. The voltage limiter is configured to limit a voltage dropped across the capacitor. The capacitive device and the voltage limiter are configured such that a first current flowing through a first branch having the voltage limiter is higher than a second current flowing through a second branch having the capacitive device.

Some embodiments regard method in a pump circuit that has at least one capacitance stage between a first node and a second node. In the method, a number of capacitance stages for the at least one capacitance stage is determined based on a predetermined pump voltage value and a maximum voltage allowed to drop across a capacitive device of a capacitance stage of the at least one capacitance stage. For each capacitance stage of the at least one capacitance stage, a voltage limiter coupled in parallel with the capacitive device of the each capacitance stage of the at least one capacitance stage is utilized such that a voltage dropped across the capacitive device of the each capacitance stage does not exceed the maximum voltage, and a first current flowing through a first branch having the voltage limiter is greater than a second current flowing through a second branch having the capacitive device.

Some embodiments regard a charge pump circuit comprising a first node, a second node, and a plurality of capacitance stages coupled in series between the first node and the second node. Each capacitance stage includes a resistor coupled in parallel with a capacitor, and is configured to pump a first voltage based on a pump voltage between the first node and the second node and a number of stages of the plurality of capacitance stages.

The above methods show exemplary steps, but they are not necessarily performed in the order shown. Steps may be added, replaced, changed order, and/or eliminated as appropriate, in accordance with the spirit and scope of the disclosed embodiments.

What is claimed is:

1. A charge pump circuit comprising:
   a first node;
   a second node; and
   at least two capacitance stages coupled in series between the first node and the second node,
   wherein each capacitance stage of the at least two capacitance stages comprising:
      a capacitive device and a voltage limiter coupled in parallel with the capacitive device, and the voltage limiter comprising a resistor;
      the voltage limiter is configured to limit a voltage dropped across the capacitive device; and
      the capacitive device and the voltage limiter are configured such that a first current flowing through a first branch having the voltage limiter is higher than a second current flowing through a second branch having the capacitive device, wherein the resistors of the voltage limiters of the at least two capacitance stages are configured as a voltage divider.

2. The charge pump circuit of claim 1, wherein the capacitive device is a metal-insulator-metal capacitor.

3. The charge pump circuit of claim 1, wherein a capacitance of each capacitance stage of the at least two capacitance stages has the same predetermined value.

4. The charge pump circuit of claim 1, wherein a number of capacitance stages of the at least two capacitance stages is adapted based on at least one of a pump voltage value between the first node and the second node, a capacitance of each capacitive device of each capacitance stage of the at least two capacitance stages, and a maximum voltage allowed to drop across the each capacitive device.

5. The charge pump circuit of claim 1, wherein a capacitance of the at least two capacitance stages is adapted based on a capacitance of the second node, a pump voltage value between the first node and the second node, and a predetermined voltage transfer ratio.

6. The charge pump circuit of claim 1, wherein the capacitive device and the voltage limiter are configured such that the first current is at least five times greater than the second current.

7. A method in a pump circuit that has at least one capacitance stage between a first node and a second node, the method comprising:
  determining a number of capacitance stages for the at least one capacitance stage based on a predetermined pump voltage value between the first node and the second node and a maximum voltage allowed to drop across a capacitive device of a capacitance stage of the at least one capacitance stage; and
  for each capacitance stage of the at least one capacitance stage, utilizing a voltage limiter coupled in parallel with a capacitive device of the each capacitance stage such that a voltage dropped across the capacitive device of the each capacitance stage does not exceed the maximum voltage and a first current flowing through a first branch having the voltage limiter is greater than a second current flowing through a second branch having the capacitive device,
  wherein a plurality of resistors of a plurality of limiters of the at least one capacitance stage is configured to function as a voltage divider between the first node and the second node, when the at least one capacitance stage includes more than one capacitance stage.

8. The method of claim 7, further comprising:
  determining a capacitance at the second node; and
  adjusting the number of capacitance stages to achieve a predetermined voltage transfer ratio; a voltage transfer ratio being based on the capacitance at the second node and a capacitance of the at least one capacitance stage.

9. The method of claim 7, wherein each capacitive device of each at least one capacitance stage is a metal-insulator-metal capacitor.

10. The method of claim 9, further comprising utilizing a manufacturing method to manufacture a memory cell of a dynamic random access memory cell to manufacture the metal-insulator-metal capacitor.

11. The method of claim 7, wherein the first current flowing through the first branch is at least five times greater than the second current flowing through the second branch.

12. The method of claim 7, wherein determining the number of capacitance stages for the at least one capacitance stage is further based on a capacitance at the second node and a voltage transfer ratio that is based on the capacitance at the second node and a capacitance of the at least one capacitance stage.

13. The method of claim 7, wherein a capacitance of each capacitance stage of the at least one capacitance stage has the same predetermined value.

14. The method of claim 7, wherein, while the first node is switching between a first voltage value and a second voltage value, the second node is switching between a third voltage value and a fourth voltage value; the third voltage value being based on an initial voltage value of the second node; the fourth voltage value being based on the initial voltage value of the second node and the pump voltage value.

15. A charge pump circuit comprising:
  a first node;
  a second node; and
  a plurality of capacitance stages coupled in series between the first node and the second node,
  wherein each capacitance stage of the plurality of capacitance stages includes a resistor coupled in parallel with a capacitor, and is configured to pump a pump-stage voltage based on a pump voltage between the first node and the second node and a number of stages of the plurality of capacitance stages.

16. The charge pump circuit of claim 15, wherein the second node is configured to switch between a first voltage value and a second voltage value in response to the first node switching between a third voltage value and a fourth voltage value.

17. The charge pump circuit of claim 15, wherein each capacitor of the pump circuit is a metal-insulator-metal capacitor.

18. The charge pump circuit of claim 15, wherein each resistor of the plurality of capacitance stages has the same resistance value, and each capacitor of the plurality of capacitance stages has the same capacitance value.

* * * * *